United States Patent
Baker et al.

(10) Patent No.: US 11,474,580 B2
(45) Date of Patent: Oct. 18, 2022

(54) ENABLEMENT OF WAKE ON FINGER PRINT SENSOR WITHOUT USB ENUMERATION

(71) Applicant: Hewlett-Packard Development Company, L.P., Spring, TX (US)

(72) Inventors: Abu Baker, Spring, TX (US); Hosup Chung, Spring, TX (US); Tony Moon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/295,026

(22) PCT Filed: Jun. 14, 2019

(86) PCT No.: PCT/US2019/037160
§ 371 (c)(1),
(2) Date: May 18, 2021

(87) PCT Pub. No.: WO2020/251582
PCT Pub. Date: Dec. 17, 2020

(65) Prior Publication Data
US 2022/0100245 A1 Mar. 31, 2022

(51) Int. Cl.
*G06F 1/26* (2006.01)
*G06V 40/13* (2022.01)
*G06F 1/3234* (2019.01)
*G06F 1/3206* (2019.01)
*G06F 1/3287* (2019.01)

(52) U.S. Cl.
CPC .............. *G06F 1/266* (2013.01); *G06F 1/325* (2013.01); *G06F 1/3206* (2013.01); *G06F 1/3253* (2013.01); *G06F 1/3287* (2013.01); *G06V 40/13* (2022.01)

(58) Field of Classification Search
CPC ...... G06F 1/266; G06F 1/3203; G06F 1/3206; G06F 1/3215; G06F 1/3231; G06F 1/325; G06F 1/3253; G06F 1/3287; G06V 40/13; Y02D 30/50
See application file for complete search history.

(56) References Cited

U.S. PATENT DOCUMENTS

| 8,510,758 B1 | 8/2013 | Harris |
| 8,661,164 B2 | 2/2014 | Chen et al. |
| 9,098,304 B2 | 8/2015 | Young et al. |

(Continued)

OTHER PUBLICATIONS

"How an Interrupt Driven Embedded System Can Save You Power". TASKING Blogs. Nov. 2, 2017. TASKING. (Year: 2017).*

*Primary Examiner* — Thomas J. Cleary
(74) *Attorney, Agent, or Firm* — HPI Patent Department

(57) ABSTRACT

In an example, a biometric sensor, includes a first communication interface to receive information associated with an enumeration of the biometric sensor from a host, a second communication interface, and input sensing circuitry to detect an input signal at the biometric sensor. The biometric sensor further includes a controller to, in response to detecting the input signal, transmit a message to wake up the host via the second communication interface, and in response to receiving an indication that a lid of the host has closed, control operation of the biometric sensor by placing the biometric sensor in a low power state.

15 Claims, 3 Drawing Sheets

(56) References Cited

U.S. PATENT DOCUMENTS

| | | | |
|---|---|---|---|
| 2006/0125796 A1* | 6/2006 | Utz | G06F 1/1666 |
| | | | 345/168 |
| 2009/0315675 A1* | 12/2009 | Yokota | G06F 21/83 |
| | | | 340/5.83 |
| 2010/0030922 A1 | 2/2010 | Lee | |
| 2010/0180136 A1* | 7/2010 | Thompson | G06F 1/3231 |
| | | | 713/324 |
| 2013/0181909 A1* | 7/2013 | Voronel | G06F 1/1662 |
| | | | 345/173 |
| 2013/0276144 A1 | 10/2013 | Hansen | |
| 2014/0198960 A1 | 7/2014 | Thompson et al. | |
| 2015/0145641 A1 | 5/2015 | Kapinos et al. | |
| 2016/0283790 A1* | 9/2016 | Douglas | H04N 5/2256 |
| 2017/0185419 A1 | 6/2017 | Park et al. | |
| 2017/0220842 A1* | 8/2017 | Thompson | G06F 21/81 |
| 2019/0326081 A1* | 10/2019 | Kurma Raju | G06F 1/1662 |
| 2021/0216639 A1* | 7/2021 | Hamlin | G06F 21/32 |

\* cited by examiner

ENABLEMENT OF WAKE ON FINGER PRINT SENSOR WITHOUT USB ENUMERATION

BACKGROUND

Electronic devices, particularly those for use in computers, may use a driver file. The driver provides information that allows components of the computer and/or operating system to communicate with other electronic device. For example, the operating system may include drivers for various devices.

Once a host computing device discovers a new peripheral device, the host may send requests to establish a direct communication path between the host and the peripheral device. From there, the host may attempt to enumerate the peripheral device by issuing control transfers that contain various requests to the device. During enumeration, the host may select a configuration for the peripheral device using device drivers.

BRIEF DESCRIPTION OF FIGURES

Various examples may be more completely understood in consideration of the following detailed description in connection with the accompanying drawings, in which.

DETAILED DESCRIPTION

Figure 1:
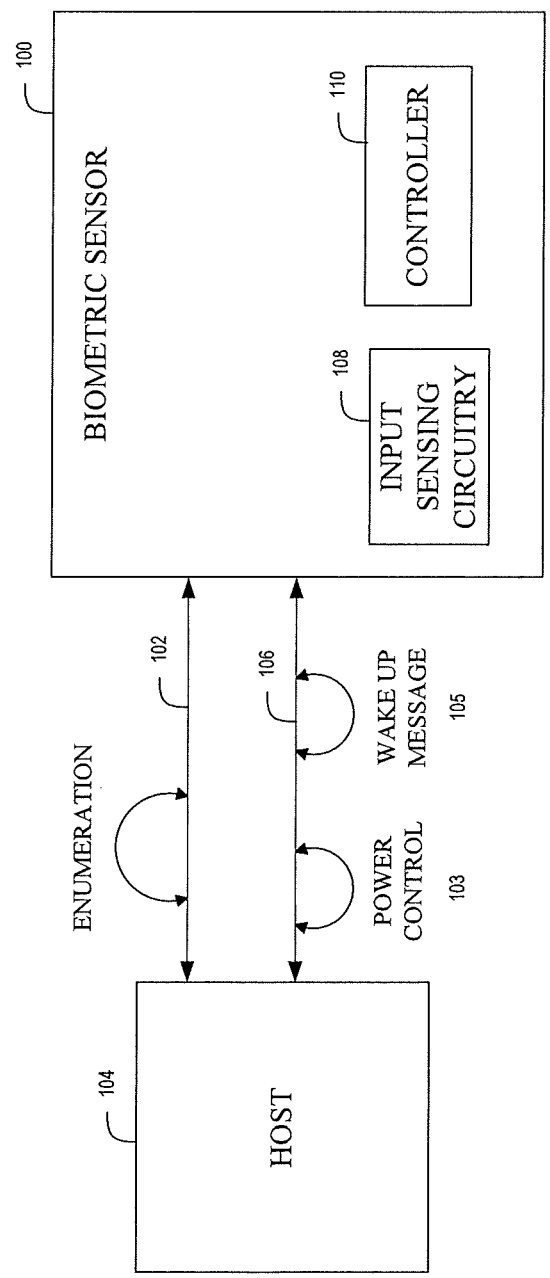
FIG. 1 illustrates an example biometric sensor, as may be implemented in biometric sensor control, consistent with the present disclosure.

An increasing number of devices are being designed to communicate in either a wired or wireless manner with other electronic devices. As an illustration, universal serial bus (USB) compliant devices such as human interface devices, mass storage devices, audio devices, video devices, communication devices, and printers, among others, may be provided with corresponding abilities to communicate with other types of USB devices. In any case, device enumeration may be utilized to connect the host device to the peripheral device. During enumeration, various configurations are established to allow the host device to communicate with the peripheral device. The enumeration process may include a number of operations, to configure the peripheral device. Moreover, the enumeration process may be repeated when the peripheral device is disconnected and re-connected to the host, or when the host is restarted, etc. Each time the enumeration process is initiated and/or restarted, time and computing resources are utilized.

Some peripheral devices utilized may include biometric sensors. Biometric sensors, as used herein, may refer to or include a sensor that converts a biometric trait of an individual person to an electric signal. Examples of biometric sensors may include fingerprint sensors, face recognition sensors, iris recognition sensors, speech recognition sensors, hand geometry sensors, and signature verification sensors, among other example biometric sensors. In some modes of operation of a host device, a biometric sensor coupled to a host computing device may unnecessarily identify biometric signals and transmit signals to the host computer, in some instances resulting in re-enumeration of the biometric sensor, thus increasing time and computing resources.

Examples described herein provide an approach to enable wake up feature of a host using a biometric sensor. For instance, some examples described herein include a biometric sensor, comprising a first communication interface to receive information associated with an enumeration of the biometric sensor from a host, and a second communication interface. The biometric sensor further includes an input sensing circuitry to detect an input signal at the biometric sensor, and a controller. In such examples, the controller transmits a message to wake up the host via the second communication interface in response to detected input signal. Moreover, in response to receiving an indication that a lid of the host has closed, the controller controls operation of the biometric sensor by placing the biometric sensor in a low power state.

Some examples described herein includes, a computing device, including circuitry to detect a position of a lid of the computing device, a first communication interface, a second communication interface, and a controller communicatively coupled to the first communication interface and the second communication interface. The controller may generate a message based on the detected position of the lid, and transmit the message to a biometric sensor coupled to the computing device, to control a power state of the biometric sensor. As described herein, the message may be transmitted to the biometric sensor via the second communication interface.

Additionally, various examples include a non-transitory computer-readable storage medium comprising instructions that when executed cause a host computing device to perform biometric sensor control. For instance, the non-transitory computer-readable storage medium may include instructions to detect closure of a lid of the host computing device. Responsive to the detected lid closure, additional instructions may cause the computing device to send a first command to a biometric sensor via a second communication interface of the biometric sensor to disable a wake on fingerprint feature of the biometric sensor. As described herein, the biometric sensor is communicatively coupled to the host computing device. Further instructions, when executed, may cause the host computing device to send a second command to the biometric sensor via the second communication interface, to place the biometric sensor in a low power mode of operation. A third command sent to the biometric sensor via the second communication interface may turn on the biometric sensor and return the biometric sensor to an active operating mode responsive to a detected opening of the lid. Thus, examples described herein may enable a biometric sensor to avoid enumeration when the biometric sensor is used to wake a host.

Turning now to the figures FIG. 1 illustrates an example biometric sensor 100, as may be implemented in biometric sensor control, consistent with the present disclosure. The biometric sensor 100 includes a first communication interface 102 to receive information associated with an enumeration of the biometric sensor 100 from a host 104. As discussed herein, enumeration may include the transmission of information between the biometric sensor 100 and the host 104 in order for the drivers for the biometric sensors 100 to install. Although aspects and features may in some cases be described in individual figures, it will be appreciated that features from one figure or example can be combined with features of another figure or example even though the combination is not explicitly shown or explicitly described as a combination. As such, FIG. 1 may include more or fewer aspects than those illustrated. Additionally, the functional blocks in FIG. 1 may be circuits configured or coded by design and/or by configurable circuitry such as Central Process Units (CPUs), logic arrays, and/or controllers, for carrying out such operational aspects.

The biometric sensor 100 also includes a second communication interface 106, input sensing circuitry 108, and a controller 110. The input sensing circuitry 108 may detect an input signal at the biometric sensor 100, such as a fingerprint or other biometric input. The controller 110 may, in response to detecting the input signal, transmit a wake up message 105 to wake up the host 104 via the second communication interface 106. Where reference is made to a "first communication interface", a "second communication interface", etc., the adjectives "first" and "second" are not used to connote any description of the structure or to provide any substantive meaning; rather, such adjectives are merely used to differentiate one circuit from another similarly-named circuit.

The controller 110 of the biometric sensor 100 may control the operation of the biometric sensor 100, responsive to signals received from the host 104. A non-limiting example of the controller 110 of the biometric sensor 100 is a fingerprint sensor driver. Additionally, the controller 110 may, in response to receiving an indication that a lid of the host 104 has closed, control operation of the biometric sensor 100 by placing the biometric sensor 100 in a low power state via a power control message 103. As described herein, a low power state refers to or includes a power state of the biometric sensor 100 in which the biometric sensor 100 uses less power as compared to during operation, while the biometric sensor is still identifiable by the host device 104. In such low power state, bus enumeration is not implemented when returning to operation, thereby improving user experience and reducing computing resources when the biometric sensor returns to an active mode of operation. For instance, the host 104 may be a computing device having a closeable lid and/or cover. In response to the lid being closed and/or otherwise covering the surface of the computing device, the controller 110 of the biometric sensor 100 may control the operation of the biometric sensor 100 and place the device in a low power state. As described more thoroughly herein, the biometric sensor 100 may remain in the low power state until subsequent instructions are received from the host 104 to enter an active mode of operation. While in the low power state, the biometric sensor 100 may not be able to detect biometric input such as fingerprints and/or hand prints, and/or the biometric sensor 100 may not be able to send the wake up message to the host 104.

As a particular illustration, the controller 110 may enable or disable a wake up feature of the biometric sensor 100 in response to receiving an indication of a mode of operation of the host 104 and an indication of a lid position of the host 104. As used herein, the wake up feature may include the message to wake up the host 104, and may be referred to herein as a wake on fingerprint feature. The controller 110 may enable the wake up feature in response to receipt of information indicative of the mode of operation of the host 104 received via the second communication interface 106. As used herein, a controller 110 refers to or includes a chip, an expansion card, or a stand-alone device that interfaces with the biometric sensor 100. In some non-limiting examples, the controller 110 may refer to or include a fingerprint sensor driver.

The wake up feature of the host 104 may be enabled when the host 104 is in particular configurations and not in others. For instance, the controller 110 may enable the wake up feature of the biometric sensor 100 in response to an indication that the host 104 is in one of tent mode, tablet mode, book mode and clamshell mode. As used herein, tent mode refers to or includes a mode of operation of a computing device in which the screen of the device is rotated about an axis and disposed on a side opposite of the keyboard, without the screen and keyboard being in direct contact. Tablet mode refers to or includes a mode of operation of a computing device in which the screen of the device provides touch-screen capabilities, allowing the keyboard to be detached and/or not used. Similarly, book mode refers to or includes a mode of operation of a computing device, in which the screen and keyboard are presented on different surfaces, such as sides of a book, enabling the user to provide input on the keyboard and view displays on the screen. Finally, clamshell mode refers to or includes a mode of operation of a computing device, in which an external display or projector may be used to display output from the computing device, while the computing device is closed, as opposed to displaying the output on the screen of the computing device.

In various examples, the controller 110 may enable the wake up feature in response to an indication that the host 104 is in clamshell mode and the lid is closed, and disable the wake up feature and place the biometric sensor 100 in a low power state in response to an indication that the host 104 is in one of tent mode, tablet mode, and book mode and the lid is closed. Accordingly, the wake up feature may be dependent on both the mode of operation of the host 104 and a position of the lid of the host 104. For instance, in various examples, the controller 110 may enable the wake up feature in response to an indication that the host 104 is in clamshell mode and the lid is closed, and disable the wake up feature and place the biometric sensor 100 in a low power state in response to an indication that the host 104 is in one of tent mode, tablet mode, and book mode and the lid is closed.

As illustrated and discussed above in connection with FIG. 1 and elsewhere in the instant disclosure, various circuit-based structure is disclosed for carrying out specific acts or functions, as may be recognized in the figures and related discussion. Whether depicted as a block, module, device, system, or controller (for example), such circuit-based structure refers to or includes circuitry designed to carry the acts or functions as so described. As specific examples of such circuit-based structure, among others, reference may be made to 108 and 110 of FIG. 1.

Figure 2:
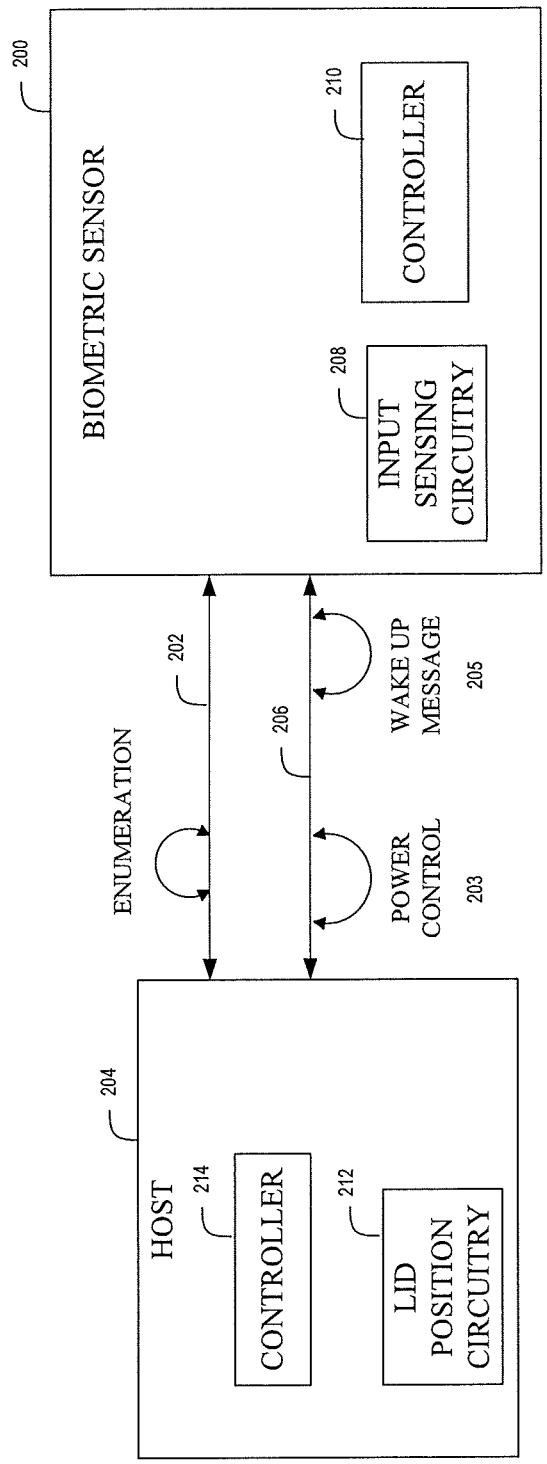
FIG. 2 illustrates an example computing device, as may be implemented in biometric sensor control, consistent with the present disclosure.

FIG. 2 illustrates an example computing device 204, as may be implemented in biometric sensor control, consistent with the present disclosure. For ease of illustration, the same reference numerals may be used in different diagrams to refer to the same elements or additional instances of the same element. In various examples, the computing device 204 may be referred to as a host, as discussed with regards to FIG. 1. As illustrated in FIG. 2, the computing device 204 may include lid position circuitry 212. The lid position circuitry 212 may detect a position of a lid of the computing device 204. For instance, the lid position circuitry 212 may detect whether the lid of the computing device is opened or closed, and communicate the position of the lid to the biometric sensor 200 via the second communication interface 206. Also, as discussed with regards to FIG. 1, the computing device may include a first communication interface 202, and a second communication interface 206. The biometric sensor 200 may include a first port for the first communication interface 202, and a second port for the second communication interface 206. Similarly, the computing device 204 may have a first port for the first communication interface 202 and a second port for the second communication interface 206. Accordingly, the host (e.g., computing device 204) and the biometric sensor 200 may have corresponding ports so that a connection may be established between the two. Although FIG. 1 discusses the first communication interface 202 and the second communication interface 206 as being components of the biometric sensor 200, examples are not so limited. For instance, the first communication interface 202 may be included in whole or in part, in computing device 204. Similarly, the second communication interface 206, may be included in whole or in part, in computing device 204. Additionally and/or alternatively, the first communication interface 202 may be included in whole or in part, in the biometric sensor 200 and the second communication interface 206, may be included in whole or in part, in biometric sensor 200. The first communication interface may physically connect a system on a chip of the computing device 204 and the biometric sensor 200. The second communication interface may physically connect controller 214 of the computing device 204 and the biometric sensor 200. A separate (e.g., third) interface may couple the system on a chip of the computing device 204 and the controller 214. While a system on a chip and controller 214 are described as separate components of the computing device 204, it is noted that in some examples, the system on a chip and controller 214 may comprise a single device.

The computing device 204 may also include a controller 214. The controller 214 may be communicatively coupled to the first communication interface 202 and the second communication interface 206. Further, the controller 214 may generate a message based on the detected position of the lid. Additionally, the controller 214 may transmit the message to the biometric sensor 200, which is coupled to the computing device 204, to control a power state of the biometric sensor 200. As described herein, the message may be transmitted to the biometric sensor 200 via the second communication interface 206. In some non-limiting examples, the controller 214 of the host 204 may refer to or include an embedded controller, though examples are not so limited.

As a non-limiting example, the controller 214 of the computing device 204 may place the biometric sensor 200 in an active operating mode via the second communication interface 206, in response to a detected opening of the lid. The lid position circuitry 212 may indicate to the controller 214 that the lid is opened, and the controller 214 may subsequently send a message, via the second communication interface 206 to the biometric sensor 200, to enter an active operating mode. As used herein, the active operating mode may be a higher power state than the low power state, and may be the operating mode in which the biometric sensor operates when implementing the wake on fingerprint mode.

The computing device 204 may further include circuitry to detect a mode of operation of the computing device 204. For instance, the computing device 204 may operate in tablet mode, book mode, clamshell mode, and/or tent mode. Based on the mode of operation of the computing device 204, the wake on fingerprint feature may be enabled or disabled. Accordingly, the controller 214 may control the power state of the biometric sensor 200 based on the mode of operation of the computing device 204, as well as the position of the lid of the computing device 204.

In various examples, the controller 214 of the computing device 204 may send instructions to the biometric sensor 200, via the second communication interface 206, indicating whether the wake on fingerprint feature of the biometric sensor 200 is to be enabled or disabled. For instance, the controller 210 of the biometric sensor 200 follow a particular set of instructions to handle close lid and device mode change events, so as to enable or disable the biometric sensor 200 as appropriate. As such, the controller 214 of the computing device 204 may send instructions to the biometric sensor 200, via the second communication interface 206, to enable a fingerprint sensor of the biometric sensor 200 as a wakeup device for the computing device 204, responsive to a detected opening of the lid.

Although illustrated similarly in FIG. 2, the first communication interface 202 and the second communication interface 206 may be similar types of communication interfaces, or different types of communication interfaces. For instance, in various examples, the first communication interface 202 is a universal serial bus (USB) circuit and the second communication interface 206 is a general purpose input output circuit. The first communication interface 202 may be a USB 2.0 interface, which is a bi-directional communication channel. This interface may perform bus enumeration, such that the host 204 identifies the biometric sensor 200. Once the biometric sensor 200 is recognized by the host 204, data can be exchanged across the first communication interface 202 between the biometric sensor 200 and the host 204. Additionally, as described herein, a user may wake the host 204 by, for instance, touching the biometric sensor 200, as described herein. In some examples, the second communication interface 206 may be other types of interface circuits, such as a serial peripheral interface (SPI), among others. The second communication interface 206 may be referred to as a sideband communication interface or sideband communication channel, and may provide an output from the host 204 and input to the biometric sensor 200. The host 204 may assert the signal to the second communication interface 206 based on the lid position circuitry 212. The controller 210 of the host 204 may identify the signal from the lid position circuitry 212, and instruct the biometric sensor 200 to enter a low power state via the second communication interface 206. As described herein, when entering the low power state, bus enumeration is not implemented, thereby improving user experience and reducing computing resources when the biometric sensor returns to an active mode of operation.

In various examples, the components of FIG. 2 may perform a method of control of a biometric sensor, as generally described herein. An example method consistent with the present disclosure includes determining, using the host computing device 204, whether a wake on fingerprint feature is to be enabled or disabled, based on the mode of operation of the host computing device 204. Responsive to a determination that wake on fingerprint is enabled on the host computing device 204, the method include controlling operation of the biometric sensor 200 coupled to the host computing device 204 by sending commands controlling the biometric sensor 200, via a second communication interface 206. Such commands may instruct the biometric sensor 200 to enter a low power mode of operation based on a mode of operation of the host computing device 204. Once the biometric sensor 200 is in the low power mode, the biometric sensor 200 may still be recognized by the operating system of the host 204, such that enumeration of the biometric sensor 200 is not performed once the biometric sensor 200 returns to an active operating state.

Figure 3:
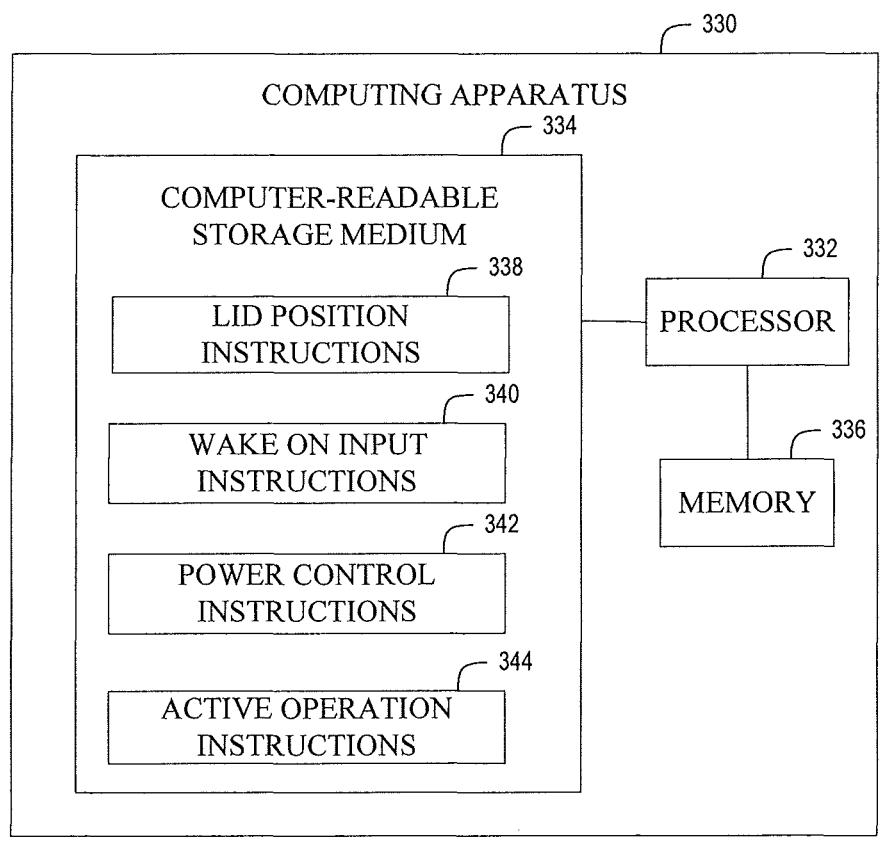
FIG. 3 illustrates an example block diagram of a computing apparatus including instructions for biometric sensor control, consistent with the present disclosure.

FIG. 3 illustrates an example block diagram of a computing apparatus 330 including instructions for biometric sensor control, consistent with the present disclosure. The computing apparatus 330 may include a processor 332, a computer-readable storage medium 334, and a memory 336. As described with regards to FIG. 1 and FIG. 2, the controller (e.g., driver) of the biometric sensor may implement lid close and device change mode events of the host device, in order to enable and/or disable the biometric sensor.

The processor 332 may be a central processing unit (CPU), a semiconductor-based microprocessor, and/or other hardware devices suitable to control operations of a biometric sensor, such as sensor 100 illustrated in FIG. 1 and/or sensor 200 illustrated in FIG. 2. Computer-readable storage medium 334 may be an electronic, magnetic, optical, or other physical storage device that contains or stores executable instructions. Thus, computer-readable storage medium 334 may be, for example, Random Access Memory (RAM), an Electrically Erasable Programmable Read-Only Memory (EEPROM), a storage device, an optical disc, etc. In some examples, the computer-readable storage medium 334 may be a non-transitory storage medium, where the term 'non-transitory' does not encompass transitory propagating signals. As described in detail below, the computer-readable storage medium 334 may be encoded with a series of executable instructions 338-344. In some examples, computer-readable storage medium 334 may implement a memory 336 to store and/or execute instructions 338-344. Memory 336 may be any non-volatile memory, such as EEPROM, flash memory, etc.

As illustrated, the computer-readable storage medium 334 may store instructions that, when executed, cause the computing apparatus 330 to perform a number of different operations to control a biometric sensor, such as sensor 100 illustrated in FIG. 1, and sensor 200 illustrated in FIG. 2. For instance, lid position instructions 338, when executed may cause the computing apparatus 330 to detect closure of a lid of the host computing device. Additionally, wake on input instructions 340, when executed may cause the computing apparatus 330 to responsive to the detected lid closure, send a first command to a biometric sensor via a second communication interface of the biometric sensor to disable a wake on fingerprint feature of the biometric sensor, wherein the biometric sensor is communicatively coupled to the host computing device. For instance, the first command may be sent by the controller (e.g., driver) of the biometric sensor to communicate with the controller of the host device. The first command may be a query from the biometric sensor to the basic input output system (BIOS) and/or controller of the host to enable or disable the biometric sensor. The host may respond with an indication if the wake on fingerprint function should be enabled or disabled due to the lid of the host device being opened of closed. Accordingly, the controller of the host device may respond to the biometric sensor by sending a first scan code if the biometric sensor should be enabled or a second scan code if biometric sensor should be disabled.

Power control instructions 342, when executed, may cause the computing apparatus 330 to send a second command to the fingerprint sensor driver via the second communication interface, to place the biometric sensor in a low power mode of operation. For instance, upon lid closure, the controller of the host may send a particular scan code to the biometric sensor.

Finally, active operation instructions 344, when executed, may cause the computing apparatus 330 to send a third command to the biometric sensor via the second communication interface to turn on the biometric sensor and return the biometric sensor to an active operating mode responsive to a detected opening of the lid. For instance, when the lid is opened, the controller of the host may send a scan code to the biometric sensor. When the biometric sensor loads, it can query the state of the lid by transmitting a command to the host. The controller of the host may respond by sending a first scan code, indicating that the lid is closed or the system is in tablet mode, and a second (different) scan code if the lid is opened and the system is not in tablet mode. The controller may additionally send a scan code to the biometric sensor when the lid changes from closed to open, and when the lid changes from an opened to a closed position.

In various examples, the computer-readable storage medium 334 includes instructions that, when executed, cause the computing apparatus 330 to send a command to the biometric sensor via the second communication interface indicating that a wake on fingerprint feature of the biometric sensor is to be disabled based on the host computing device being in a tablet mode, a book mode, or a tent mode of operation.

Additionally, the computer-readable storage medium 334 includes instructions that, when executed, cause the computing apparatus 330 to send a command to the biometric sensor via the second communication interface indicating that a wake on fingerprint feature of the biometric sensor is to be enabled based on the host computing device being in a clamshell mode of operation. As described here, the wake on fingerprint feature allows the biometric sensor to wake the host computing device from a standby mode responsive to identification of a fingerprint by the biometric sensor.

What is claimed is:

1. A biometric sensor, comprising:
   a first communication interface to receive information associated with an enumeration of the biometric sensor from a host;
   a second communication interface;
   input sensing circuitry to detect an input signal at the biometric sensor;
   a controller to:
      in response to detecting the input signal, transmit a message to wake up the host via the second communication interface;
      transmit a command to the host to query the state of a lid of the host; and
      in response to receiving an indication that the lid of the host has closed, control operation of the biometric sensor by placing the biometric sensor in a low power state.

2. The biometric sensor of claim 1, wherein the controller is to enable or disable a wake up feature of the biometric sensor in response to receiving an indication of a mode of operation of the host and an indication of a lid position of the host, the wake up feature including the message to wake up the host.

3. The biometric sensor of claim 2, wherein the controller is to enable the wake up feature in response to receipt of information indicative of the mode of operation of the host received via the second communication interface.

4. The biometric sensor of claim 2, wherein the controller is to enable or disable the wake up feature in response to an indication that the host is in one of tent mode, tablet mode, book mode, and clamshell mode.

5. The biometric sensor of claim 4, wherein the controller is to:
   enable the wake up feature in response to an indication that the host mode of operation is clamshell mode and the lid is closed; and
   disable the wake up feature and place the biometric sensor in a low power state in response to an indication that the host mode of operation is one of tent mode, tablet mode, and book mode and the lid is closed.

6. A computing device, comprising:
- circuitry to detect a position of a lid of the computing device;
- a first communication interface, and a second communication interface; and
- a controller communicatively coupled to the first communication interface and the second communication interface, wherein the controller is to:
  - receive a command from a biometric sensor coupled to the computing device, the command to query the state of the lid of the computing device;
  - generate a message based on the detected position of the lid; and
  - transmit the message to the biometric sensor to control a power state of the biometric sensor, wherein the message is transmitted to the biometric sensor via the second communication interface.

7. The computing device of claim 6, wherein the controller is to place the biometric sensor in an active operating mode via the second communication interface, in response to a detected opening of the lid.

8. The computing device of claim 6, further including circuitry to detect a mode of operation of the computing device, wherein the controller is to control the power state of the biometric sensor based on the mode of operation of the computing device, and the position of the lid of the computing device.

9. The computing device of claim 6, wherein the controller is to send instructions to the biometric sensor, via the second communication interface, indicating whether a wake on fingerprint feature of the biometric sensor is to be enabled or disabled.

10. The computing device of claim 6, wherein the controller is to send instructions to the biometric sensor, via the second communication interface, to enable a fingerprint sensor of the biometric sensor as a wakeup device for the computing device, responsive to a detected opening of the lid.

11. The computing device of claim 6, wherein the first communication interface is a universal serial bus (USB) circuit and the second communication interface is a general purpose input output circuit.

12. A non-transitory computer-readable storage medium comprising instructions that when executed cause a host computing device to:
- receive, from a biometric sensor via a second communication interface of the biometric sensor, a query of the state of a lid of the host computing device, wherein the biometric sensor is communicatively coupled to the host computing device;
- detect closure of the lid of the host computing device;
- responsive to the detected lid closure, send a first command to the biometric sensor via the second communication interface of the biometric sensor to disable a wake on fingerprint feature of the biometric sensor;
- send a second command to the biometric sensor via the second communication interface, to place the biometric sensor in a low power mode of operation; and
- send a third command to the biometric sensor via the second communication interface to turn on the biometric sensor and return the biometric sensor to an active operating mode responsive to a detected opening of the lid.

13. The non-transitory computer-readable storage medium of claim 12, including instructions that when executed cause the host computing device to:
- responsive to the detected lid closure, send a command to the biometric sensor via the second communication interface indicating that a wake on fingerprint feature of the biometric sensor is to be disabled based on the host computing device mode of operation being a tablet mode, a book mode, or a tent mode.

14. The non-transitory computer-readable storage medium of claim 12, including instructions that when executed cause the host computing device to:
- responsive to the detected lid closure, send a command to the biometric sensor via the second communication interface indicating that a wake on fingerprint feature of the biometric sensor is to be enabled based on the host computing device mode of operation being a clamshell mode.

15. The non-transitory computer-readable storage medium of claim 14, wherein the wake on fingerprint feature of the biometric sensor wakes the host computing device from a standby mode responsive to identification of a fingerprint by the biometric sensor.

* * * * *